US011319943B2

(12) United States Patent
Kawai et al.

(10) Patent No.: US 11,319,943 B2
(45) Date of Patent: May 3, 2022

(54) COMPRESSOR (71) Applicant: HITACHI AUTOMOTIVE SYSTEMS, LTD., Ibaraki (JP)

(72) Inventors: Yoshinori Kawai, Ebina (JP); Tsutomu Ito, Sagamihara (JP); Kan Kobayashi, Yokohama (JP); Hiroshi Sakai, Tama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 364 days.

(21) Appl. No.: 16/064,516

(22) PCT Filed: Dec. 14, 2016

(86) PCT No.: PCT/JP2016/087246
§ 371 (c)(1),
(2) Date: Jun. 21, 2018

(87) PCT Pub. No.: WO2017/110624
PCT Pub. Date: Jun. 29, 2017

(65) Prior Publication Data
US 2019/0003470 A1 Jan. 3, 2019

(30) Foreign Application Priority Data
Dec. 24, 2015 (JP) .............................. JP2015-251840

(51) Int. Cl.
*F04B 39/16* (2006.01)
*F04B 35/04* (2006.01)
(Continued)

(52) U.S. Cl.
CPC .............. *F04B 39/16* (2013.01); *F04B 35/04* (2013.01); *F04B 35/045* (2013.01);
(Continued)

(58) Field of Classification Search
CPC .... F04B 39/16; F04B 53/1082; F04B 35/045; F04B 35/04; F04B 7/00; F04B 7/02;
(Continued)

(56) References Cited

U.S. PATENT DOCUMENTS 5,634,494 A * 6/1997 Martens .................. E03F 1/006
137/205
5,733,108 A * 3/1998 Riffe .................... F04B 39/0011
417/542
(Continued)

FOREIGN PATENT DOCUMENTS

CN 202182010 U * 4/2012
DE 10 2004 005 117 A1 9/2004
(Continued)

OTHER PUBLICATIONS

International Search Report dated Mar. 7, 2017 in International (PCT) Application No. PCT/JP2016/087246.
(Continued)

*Primary Examiner* — Essama Omgba
*Assistant Examiner* — Christopher J Brunjes
(74) *Attorney, Agent, or Firm* — Wenderoth, Lind & Ponack, L.L.P.

(57) ABSTRACT

Provided is a compressor capable of achieving a reduction in overall size and an improvement in vehicle mountability by using a linear motor. The compressor 1 comprises a linear motor 2 having a reciprocating mover 6, a compression unit 9 having a piston 11 connected to the mover 6 at one end side of the linear motor 2 so as to reciprocate and a cylinder 10 slidably accommodating the piston 11 to form a compression chamber 10B, and an air dryer 17 connected to a cylinder head 14 of the compression chamber 10B of the compression unit 9 and filled therein with a desiccant 17C. The air
(Continued)

dryer 17 is disposed along the axis in the movement direction of the mover 6 the piston 11.

4 Claims, 7 Drawing Sheets (51) Int. Cl.
 *F04B 53/10* (2006.01)
 *B60G 17/052* (2006.01)
(52) U.S. Cl.
 CPC ...... *F04B 53/1082* (2013.01); *B60G 17/0521* (2013.01); *B60G 2202/152* (2013.01); *B60G 2500/30* (2013.01); *B60G 2600/66* (2013.01)
(58) Field of Classification Search
 CPC ........ F04B 9/02; F04B 17/03; B60G 17/0521; B60G 2202/152; B60G 2500/30; B60G 2600/66
 USPC .............................. 417/454, 410.1, 415, 439
 See application file for complete search history.

(56) References Cited

U.S. PATENT DOCUMENTS

| | | | |
|---|---|---|---|
| 6,074,177 A * | 6/2000 | Kobayashi | F04B 39/16 417/313 |
| 6,273,688 B1 | 8/2001 | Kawahara et al. | |
| 2002/0056439 A1 * | 5/2002 | Blair | F02B 23/08 123/432 |
| 2004/0173518 A1 * | 9/2004 | Yuan | B01D 35/26 210/416.3 |
| 2004/0228743 A1 | 11/2004 | Oshita et al. | |
| 2013/0320639 A1 * | 12/2013 | Frank | F16K 31/0675 280/5.514 |
| 2015/0151603 A1 * | 6/2015 | Kondo | B60G 17/017 280/6.157 |

FOREIGN PATENT DOCUMENTS

| | | |
|---|---|---|
| DE | 699 26 585 T2 | 4/2006 |
| JP | 3-158732 | 7/1991 |
| JP | 11-264375 | 9/1999 |
| JP | 2002-252959 | 9/2002 |
| JP | 2011-74842 | 4/2011 |

OTHER PUBLICATIONS

Office Action dated Jan. 14, 2021 in corresponding German Application No. 112016005979.5, with English Translation.

* cited by examiner

COMPRESSOR

TECHNICAL FIELD

The present invention relates to compressors installed in vehicles, for example, four-wheel automobiles.

BACKGROUND ART

Four-wheel automobiles or other vehicles include those equipped with compressors for performing vehicle height adjustment. There is known a compressor of this type which has a compression unit generating compressed air by reciprocating a piston through a crank mechanism connected to an output shaft of a rotary motor, and an air dryer drying compressed air from the compression unit and sending dried compressed air to air springs or the like (for example, see Patent Literature 1).

CITATION LIST

Patent Literature

PTL 1: Japanese Patent Application Laid-Open Publication No. Hei 11-264375

SUMMARY OF INVENTION

Technical Problem

The compressor disclosed in Patent Literature 1 uses a crank mechanism driven by a rotary motor. Accordingly, the compression unit is laid out at right angles to the output shaft of the rotary motor, so that the compressor undesirably has a convex-shaped configuration as a whole. Consequently, the compressor becomes large in size, and vehicle mountability is degraded.

The present invention has been made in view of the above-described problem associated with the prior art, and it is an object of the present invention to provide a compressor capable of achieving a reduction in overall size and an improvement in vehicle mountability by using a linear motor.

Solution to Problem

To solve the above-described problem, the present invention provides a compressor comprising a linear motor having a reciprocating mover, a compression unit having a piston connected to the mover at one end side of the linear motor so as to reciprocate and a cylinder slidably accommodating the piston to form a compression chamber, and an air dryer connected to a discharge part of the compression chamber of the compression unit and filled therein with a desiccant, the air dryer being disposed such that an axis thereof extends along an axis of the piston.

Advantageous Effects of the Invention

According to the present invention, it is possible to reduce the overall size and to improve mountability to vehicles or the like by using a linear motor.

DESCRIPTION OF EMBODIMENTS

Compressors according to embodiments of the present invention will be explained below in detail with reference to the accompanying drawings.

Figure 1:
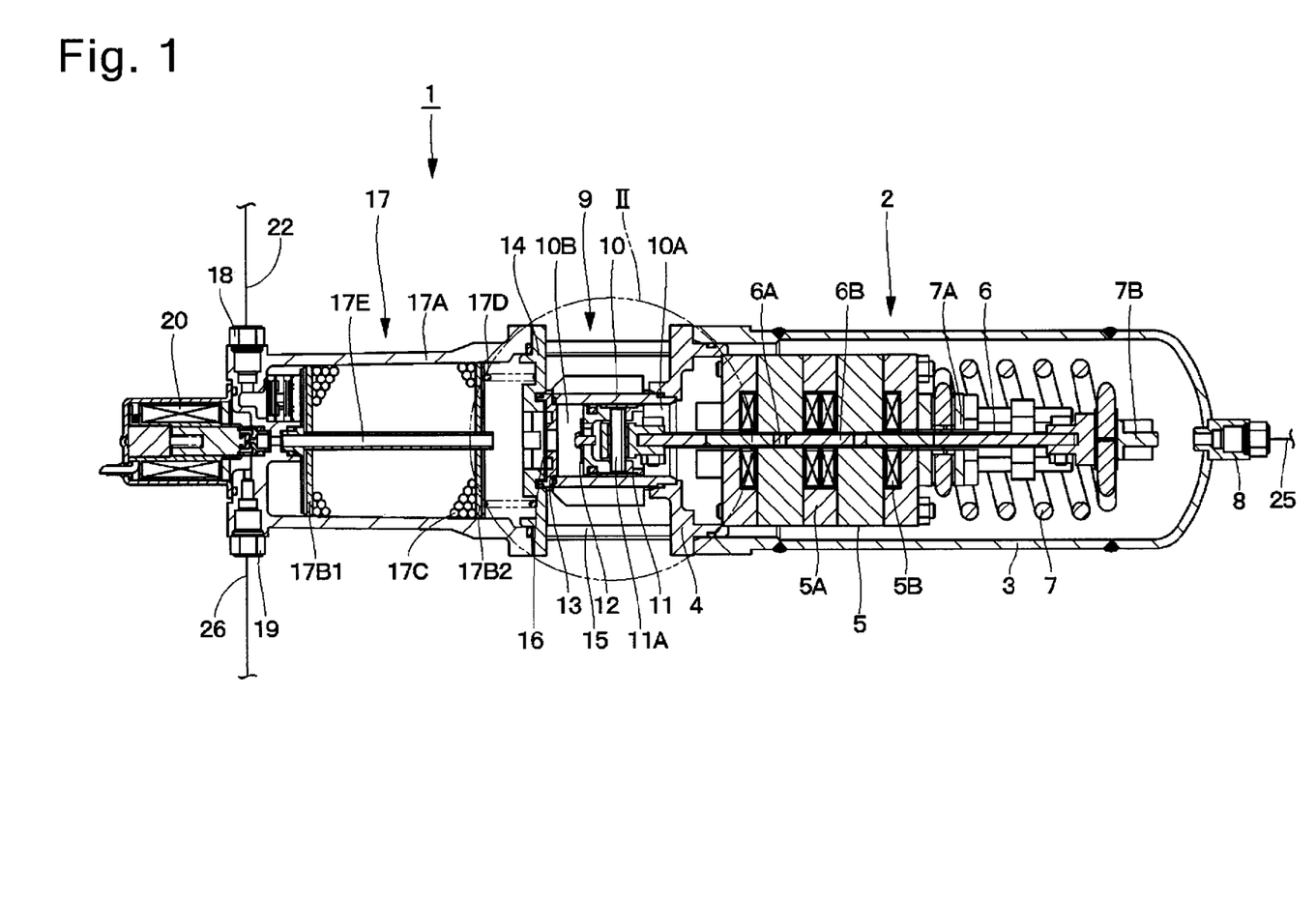
FIG. 1 is a sectional view showing an overall structure of a compressor according to a first embodiment.

First, FIG. 1 shows a first embodiment of the present invention. In FIG. 1, a compressor 1 is constructed by including a linear motor 2, a compression unit 9 having a cylinder 10 and a piston 11, and an air dryer 17. It should be noted that, in the following, the air dryer 17 side (left-hand side in FIG. 1) of the compressor 1 will be referred to as "one end side", and the linear motor 2 side (right-hand side in FIG. 1) of the compressor 1 will be referred to as "the other end side".

The linear motor 2 is provided as a drive source of the compressor 1 at the other end side of the compressor 1. The linear motor 2 comprises a combination of a motor casing 3 and a linear motor base 4, which constitute an outer shell of the linear motor 2, an armature 5, a mover (armature) 6, a spring 7, and so forth. The linear motor 2 is driven by applying an electric current to coils 5B of the armature 5 to reciprocate the mover 6 in the axial direction, thereby generating a reciprocating drive force in the piston 11.

The motor casing 3 is formed as a hollow container made of a metal material, e.g. an aluminum material, in the shape of a bottomed circular cylinder open at one end thereof and closed at the other end thereof. The motor casing 3 accommodates therein the armature 5, the mover 6, the spring 7, etc. The motor casing 3 has the linear motor base 4 engaged with the opening end thereof so as to close the opening thereof. In other words, the linear motor base 4 has the motor casing 3 secured thereto by screwing or the like.

The armature 5 is fixedly provided in the motor casing 3 as a stator. The armature 5 comprises a substantially cylindrical core 5A formed, for example, from a dust core, laminated electromagnetic steel sheets, or a magnetic material piece, and a plurality of coils 5B accommodated in the core 5A, each coil 5B being wound in a predetermined direction.

On the other hand, the mover 6 is located at the inner peripheral side of the armature 5, extending in an axial direction (horizontal direction in FIG. 1) of the motor casing 3. That is, the mover 6 is disposed in the motor casing 3 along the center axis of the linear motor 2. The mover 6 comprises a yoke 6A formed in the shape of a flat plate by using a magnetic material, and a plurality of permanent magnets 6B disposed in the form of flat plates on the obverse and reverse surfaces of the yoke 6A. The mover 6 reciprocates in the motor casing 3 in response to application of an electric current to the coils 5B of the armature 5.

The spring 7 is provided in the motor casing 3 at the other end side of the linear motor 2. One end of the spring 7 is secured to one end of the armature 5 by using a connecting member 7A, and the other end of the spring 7 is axially movably attached to the other end of the mover 6 by using a connecting member 7B. The spring 7 is formed, for example, from a compression coil spring, and has the mover 6 secured thereto toward the other end side of the compressor 1. In this case, the spring 7 axially extends and contracts in accordance with the reciprocating motion of the mover 6.

A suction port 8 is provided in the bottom of the motor casing 3 at the other end side of the linear motor 2. The suction port 8 is configured to suck air into the motor casing 3 from the outside during the suction stroke of the compressor 1. The suction port 8 is connected to a suction line 25 (described later).

The compression unit 9 is provided between the linear motor 2 and the air dryer 17. The compression unit 9 is constructed by including a cylinder 10, a piston 11, an intake valve 12, a valve plate 13, a cylinder head 14, and a discharge valve 16. The compression unit 9 drives the piston 11 by the reciprocating motion of the mover 6 of the linear motor 2 to compress outside air, thereby generating compressed air (working gas).

Figure 2:
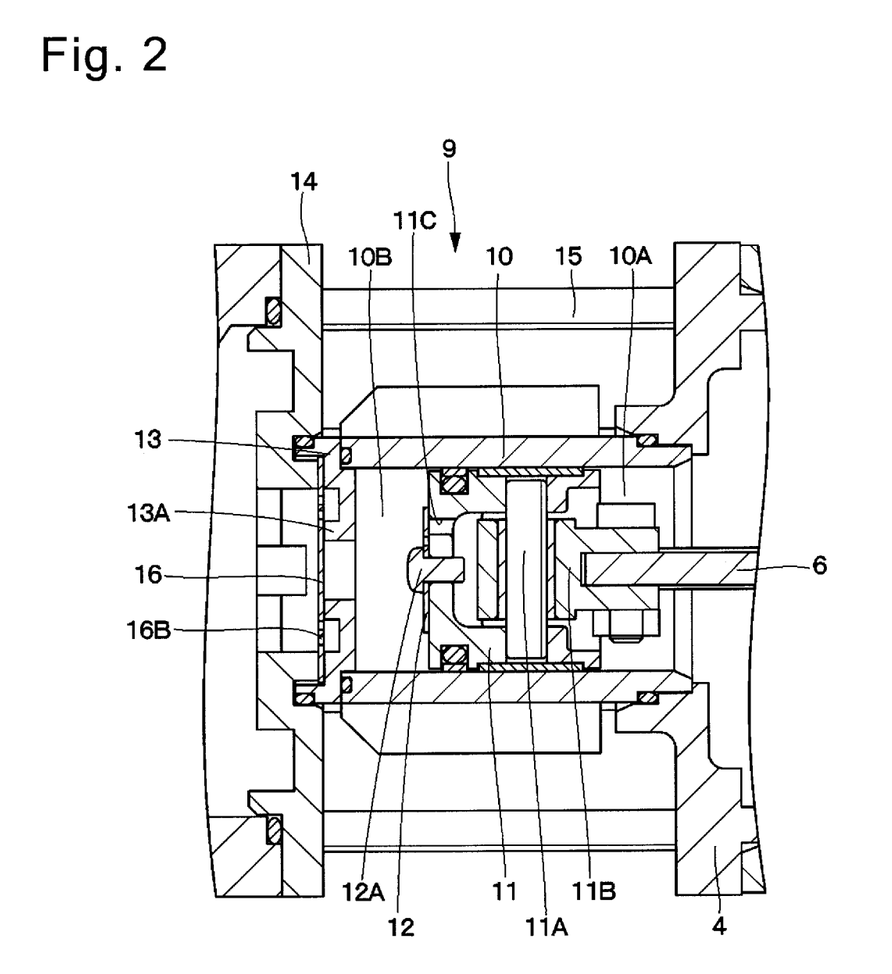
FIG. 2 is an enlarged view of a part II of FIG. 1.

The cylinder 10 is closed at one end thereof by the valve plate 13 and secured at the other end thereof to the linear motor base 4. The cylinder 10 is formed in a circular cylindrical shape by using an aluminum material, for example, and has the piston 11 accommodated therein reciprocatably (slidably). Thus, the interior of the cylinder 10 is divided by the piston 11, as shown in FIG. 2, into a non-compression chamber 10A communicating with the interior of the motor casing 3 and a compression chamber 10B located closer to the cylinder head 14.

The piston 11 is reciprocatably fitted in the cylinder 10. The piston 11 defines the non-compression chamber 10A and the compression chamber 10B in the cylinder 10. The piston 11 is connected to one end of the mover 6 of the linear motor 2 through a piston pin 11A and a connecting member 11B. Thus, the piston 11 is provided so as to extend in the axial direction of the linear motor 2 (motor casing 3) and reciprocates in the cylinder 10 in conjunction with the reciprocating motion of the mover 6. In other words, the piston 11 is disposed along the axis in the movement direction of the mover 6 of the linear motor 2.

Here, the piston 11 is provided with a communication hole 11C communicating between the non-compression chamber 10A and the compression chamber 10B. The communication hole 11C has an intake valve 12 attached thereto by using a screw 12A or by staking or crimping. The intake valve 12 opens the communication hole 11C during the suction stroke of the compressor 1 to provide communication between the non-compression chamber 10A and the compression chamber 10B, and closes the communication hole 11C during the compression stroke to cut off the communication between the non-compression chamber 10A and the compression chamber 10B.

The valve plate 13 and the cylinder head 14 are attached to one end of the cylinder 10 so as to close the one end of the cylinder 10. The cylinder head 14 engages the other end of the air dryer 17 as a discharge part from which compressed air is discharged, thereby closing the other end opening of the air dryer 17. Between the cylinder head 14 and the linear motor base 4, a plurality of securing members 15 are provided to clamp and secure the cylinder 10 between the cylinder head 14 and the linear motor base 4.

Figure 3:
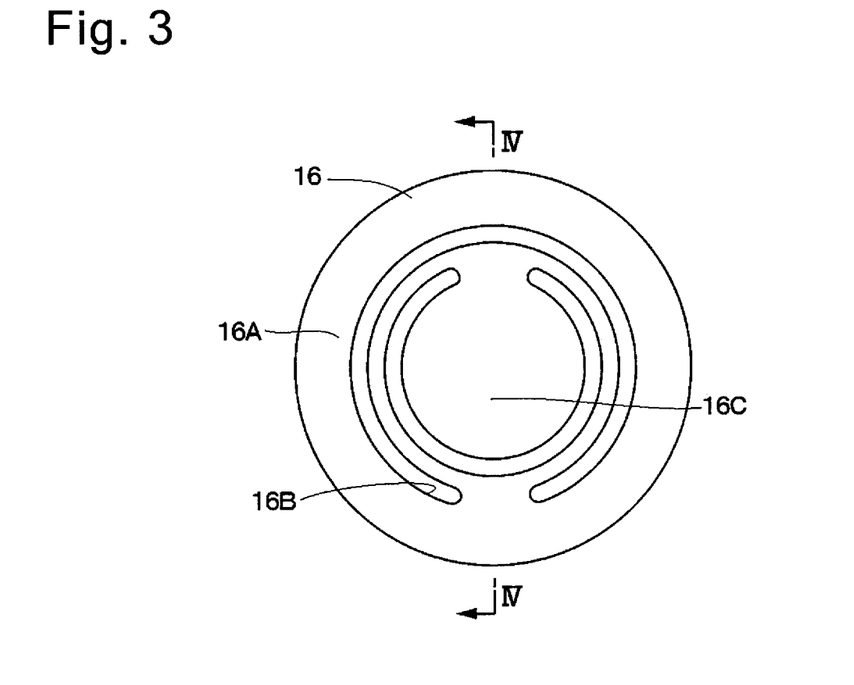
FIG. 3 is a plan view showing a discharge valve in FIG. 2 as a single component.
Figure 4:
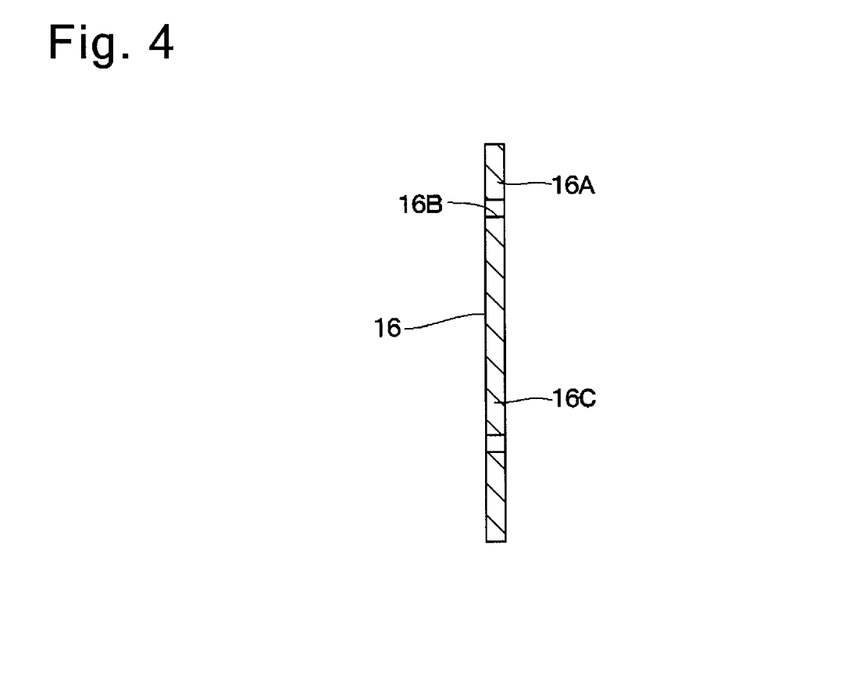
FIG. 4 is a sectional view of the discharge valve as seen from the direction of arrow IV-IV in FIG. 3.

The discharge valve 16 is provided between the valve plate 13 and the cylinder head 14 to constitute a reed valve seating on and unseating from a valve seat 13A of the valve plate 13. The discharge valve 16 is formed from a circular sheet having elasticity (spring property), which comprises, as shown in FIGS. 3 and 4, a base portion 16A clamped between the valve plate 13 and the cylinder head 14, a circular cut portion 16B, and a valving element 16C formed by the cut portion 16B. The valving element 16C is integrated with the base portion 16A at a circumferential portion thereof. Therefore, during the suction stroke of the compressor 1, the valving element 16C seats on the valve seat 13A to cut off the communication between the compression chamber 10B and the interior of the air dryer 17. During the compression stroke of the compressor 1, the valving element 16C unseats from the valve seat 13A to provide communication between the compression chamber 10B and the interior of the air dryer 17.

The air dryer 17 is provided at one end side of the compressor 1 opposite the linear motor 2 across the compression unit 9. In this case, the air dryer 17 is disposed in series such that the axial direction of the air dryer 17 extends in the axial direction of the piston 11. That is, the axis of the air dryer 17 and the axis of the piston 11 extend substantially in a straight line. In still other words, the air dryer 17 is disposed along the axis in the movement direction of the mover 6 of the linear motor 2 and the piston 11. Further, the air dryer 17 is constructed by including a housing 17A, filters 17B1 and 17B2, a desiccant 17C, a spring 17D, and an exhaust pipe 17E. The air dryer 17 supplies dry compressed air (dry air) when compressed air is to be supplied from the compressor 1 to each air suspension 21 (described later).

The housing 17A is formed as a hollow container made of a metal material, e.g. an aluminum material in the shape of a bottomed circular cylinder closed at one end thereof and open at the other end thereof. The housing 17A is engaged at the other end thereof with the cylinder head 14 to thereby close the opening end of the housing 17A. The interior of the housing 17A is defined by filters 17B1 and 17B2. The space defined by the filters 17B1 and 17B2 is filled with a desiccant 17C. The filters 17B1 and 17B2 prevent a part of the desiccant 17C from flowing out to the outside. Between the filter 17B2 and the cylinder head 14, a spring 17D is provided to urge the filter 17B2 toward the one end side of the compressor 1 at all times.

The exhaust pipe 17E is provided between the filters 17B1 and 17B2 so as to extend therethrough to provide communication between one end side and the other end side of the air dryer 17. One end of the exhaust pipe 17E communicates with an exhaust port 19 through an exhaust valve 20 (described later), and the other end of the exhaust pipe 17E communicates with the space between the filter 17B2 and the cylinder head 14. The exhaust pipe 17E passes compressed air (non-dried compressed air, from which water has not been adsorbed by the desiccant 17C) toward the exhaust port 19 in a direction in which the compressed air is discharged into the atmosphere.

A supply-discharge port 18 is provided at one side in the circumferential direction of the bottom of the housing 17A at the one end side of the air dryer 17. The supply-discharge port 18 is connected to a supply-discharge line 22 (described later) to supply compressed air compressed in the compression chamber 10B and dried in the air dryer 17 toward the air suspensions 21 and to discharge dry compressed air discharged from the air suspensions 21 into the housing 17A of the air dryer 17.

On the other hand, the exhaust port 19 is provided at the other side in the circumferential direction of the bottom of the housing 17A at the one end side of the air dryer 17. The exhaust port 19 is connected to an exhaust line 26 (described later) to discharge compressed air from the exhaust pipe 17E to the outside. Here, an exhaust valve 20 is provided between the exhaust port 19 and the exhaust pipe 17E.

Figure 5:
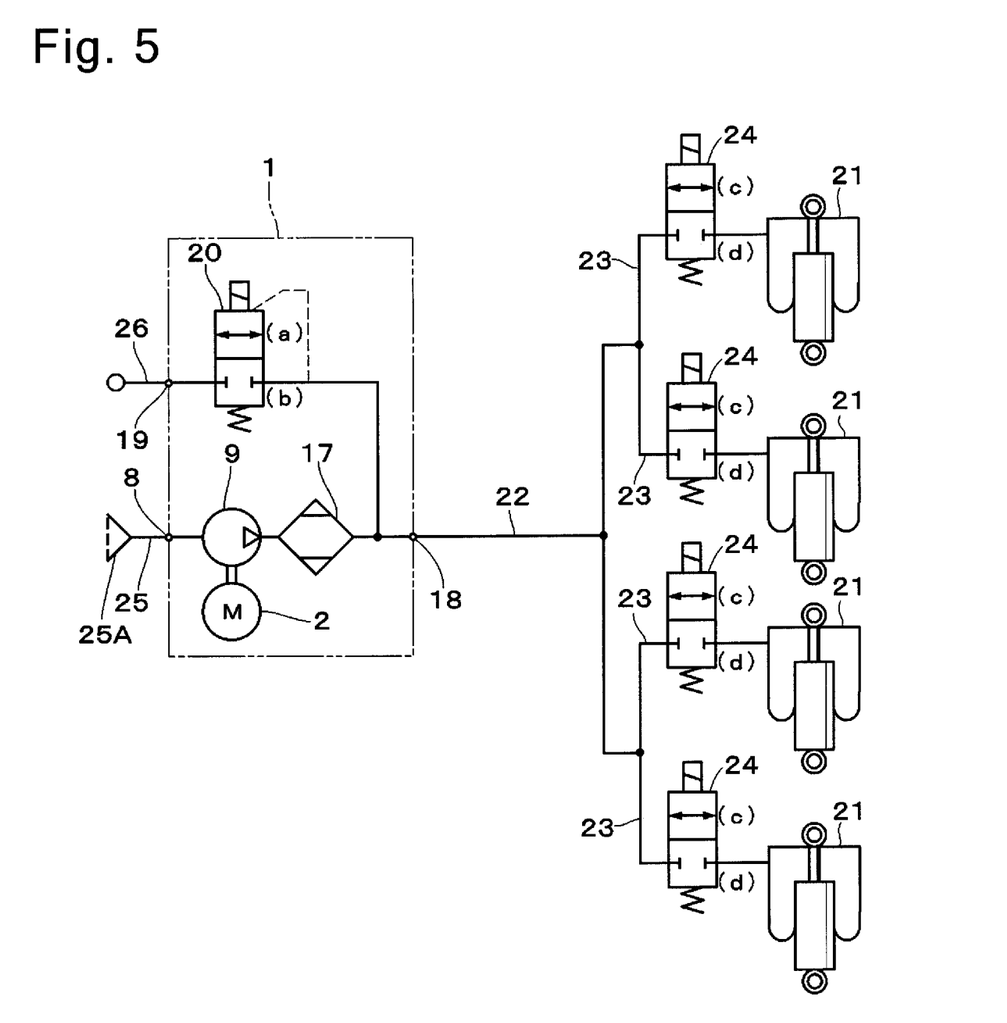
FIG. 5 is a pneumatic circuit diagram showing an air suspension mechanism using the compressor according to the first embodiment.

The exhaust valve 20 is a valve configured to allow the exhaust port 19, which is connected to the exhaust line 26, to communicate with the atmosphere (outside air) and to cut off the communication therebetween. The exhaust valve 20 comprises an ON/OFF (open-close) electromagnetic valve, and is selectively switched between an open position (a) where the exhaust valve 20 opens the exhaust port 19 to allow discharge of compressed air from the exhaust pipe 17E and a closed position (b) where the exhaust valve 20 closes the exhaust port 19 to block the discharge of compressed air from the exhaust pipe 17E. That is, the exhaust valve 20 is normally closed to cut off the exhaust pipe 17E from the exhaust port 19. When the exhaust valve 20 opens, the exhaust pipe 17E is communicated with the exhaust port 19 to discharge (release) compressed air from the exhaust pipe 17E into the atmosphere through the exhaust port 19 and the exhaust line 26.

Next, the compressor 1 of the first embodiment will be explained in detail by using FIG. 5 and by taking, as an example, a case where the compressor 1 is applied to an air suspension mechanism of a vehicle, e.g. a four-wheel automobile. The air suspension mechanism is constructed by including a compressor 1, air suspensions 21, a supply-discharge line 22, supply-exhaust valves 24, and so forth.

There are four air suspensions 21 provided as air springs between axle- and body-side members (not shown) of the vehicle in association with the front and rear left and right wheels (not shown) of the vehicle. It should be noted that the air suspensions 21 may be provided only for the front or rear wheels of the vehicle. Each air suspension 21 is configured such that when compressed air is supplied thereto or discharged therefrom, the air suspension 21 extends or contracts vertically according to the amount of supply or discharge (amount of compressed air) at that time, thereby performing height adjustment of the vehicle, and supporting the vehicle body vertically movably. The air suspensions 21 are connected to the compressor 1 through the supply-discharge line 22 and respective branch lines 23.

The supply-discharge line 22 is connected to the supply-discharge port 18 of the compressor 1 at one end thereof located at the upstream side thereof. The other end of the supply-discharge line 22, which is located at the downstream side thereof, is connected to the branch lines 23. The supply-discharge line 22 and the branch lines 23 perform supply and discharge of compressed air to and from the air suspensions 21.

The supply-exhaust valves 24 are provided halfway in the branch lines 23, respectively, each being located between the associated air suspension 21 and the compressor 1. Each supply-exhaust valve 24 comprises an ON/OFF electromagnetic valve substantially in the same way as the exhaust valve 20, and is selectively switched between an open position (c) where the supply-exhaust valve 24 opens the associated branch line 23 to allow supply or discharge of compressed air to or from the associated air suspension 21 and a closed position (d) where the supply-exhaust valve 24 closes the associated branch line 23 to block supply or discharge of compressed air to or from the associated air suspension 21.

The suction line 25 is provided to connect to the suction port 8 of the compressor 1. The suction line 25 is constantly communicated with the atmosphere to allow air sucked in through an intake filter 25A to flow into the compressor 1.

On the other hand, the exhaust line 26 is provided to connect to the exhaust port 19 of the compressor 1. The exhaust line 26 is constantly communicated with the atmosphere. When the exhaust valve 20 opens, the exhaust line 26 communicates with the exhaust pipe 17E through the exhaust port 19 to discharge (release) compressed air from the exhaust pipe 17E into the atmosphere.

The following is an explanation of the operation of the compressor 1 according to the first embodiment having the above-described structure.

First, when an electric current is applied to the coils 5B of the armature 5 of the linear motor 2, the permanent magnets 6B of the mover 6 are subjected to thrust in the axial direction, causing the whole mover 6 to slide toward the one end side of the compressor 1. At this time, the spring 7 is contracted; therefore, when the direction of electric current is reversed, the mover 6 is caused to slide toward the other end side of the compressor 1 by the urging force of the spring 7. The reciprocating thrust of the mover 6 is transmitted to the piston 11 through the connecting member 11B. Consequently, the piston 11 reciprocates in the cylinder 10 and thus alternately repeats a suction stroke where the piston 11 moves away from the cylinder head 14 and a compression stroke where the piston 11 moves toward the cylinder head 14.

In this case, during the suction stroke of the piston 11, when the pressure in the compression chamber 10B shows a trend toward negative pressure, the intake valve 12 opens accordingly. As a result, the non-compression chamber 10A and the compression chamber 10B communicate with each other through the communication hole 11C, which is provided in the piston 11. Consequently, the outside air flowing into the non-compression chamber 10A through the motor casing 3 from the suction port 8 of the motor casing 3 is sucked into the compression chamber 10B via the communication hole 11C.

On the other hand, during the compression stroke of the piston 11, when the pressure in the compression chamber 10B increases and becomes higher than the valve opening pressure of the discharge valve 16, the valving element 16C of the discharge valve 16 opens. Consequently, compressed air in the compression chamber 10B flows into the air dryer 17. The air dryer 17 brings the compressed air into contact with the desiccant 17C to adsorb and remove water from the compressed air, and supplies dry compressed air toward the air suspensions 21 through the supply-discharge port 18.

Here, when the vehicle height is to be raised through the air suspensions 21 by supplying compressed air to the air suspensions 21, the supply-exhaust valves 24 are switched from the closed position (d) to the open position (c). In this state, the compressor 1 is activated to thereby supply compressed air to the air suspensions 21 through the supply-discharge line 22 and the branch lines 23. After completion of the vehicle height raising operation, the supply-exhaust valves 24 are switched to the closed position (d) to close the branch lines 23. Thus, the supply of compressed air to the air suspensions 21 is cut off to hold the air suspensions 21 in the extended position, thereby enabling the vehicle height to be maintained in the raised position.

On the other hand, when the vehicle height is to be lowered, the supply-exhaust valves 24 are switched to the open position (c), and the exhaust valve 20 is switched from the closed position (b) to the open position (a). Consequently, compressed air in the air suspensions 21 is led out into the compressor 1 through the branch lines 23 and the supply-discharge line 22. Compressed air flowing into the compressor 1 through the supply-discharge port 18 flows backward through the air dryer 17 to desorb water from the desiccant 17C, thereby regenerating the desiccant 17C. Thereafter, compressed air is discharged (released) to the outside through the exhaust pipe 17E, the exhaust valve 20, the exhaust port 19, and the exhaust line 26. As a result, compressed air is discharged from the air suspensions 21, and thus the air suspensions 21 shift to a contracted state, thereby enabling the vehicle height to be lowered.

Thus, according to the first embodiment, the compressor 1 is constructed by disposing the linear motor 2, the piston 11, and the air dryer 17 such that the axes of these components extend along each other, for example, in a straight line. In other words, the air dryer 17 is disposed along the axis in the movement direction of the mover 6 of the linear motor 2 and the piston 11. Consequently, the linear motor 2, the compression unit 9, and the air dryer 17 can be provided in series in the axial direction of the compressor 1. Accordingly, the compressor 1 can be reduced in radial dimension to achieve a size reduction, and the compressor 1 can be reduced in thickness and formed in a rectilinear shape. In consequence of the reduction in radial dimension of the compressor 1, it is possible to increase the degree of freedom of layout design and to achieve space saving. Therefore, the vehicle mountability of the compressor 1 can be improved.

Figure 6:
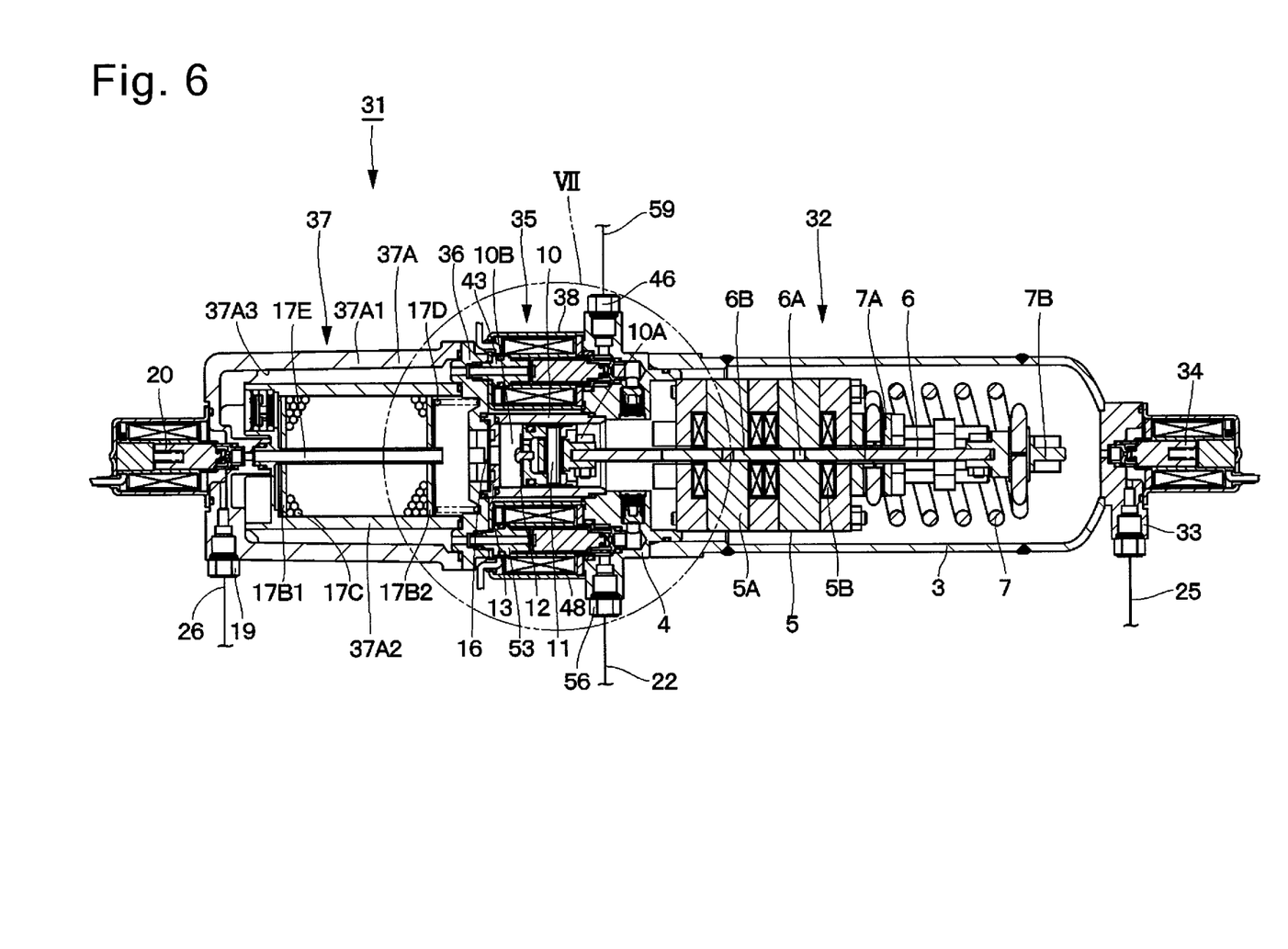
FIG. 6 is a sectional view showing an overall structure of a compressor according to a second embodiment.
Figure 7:
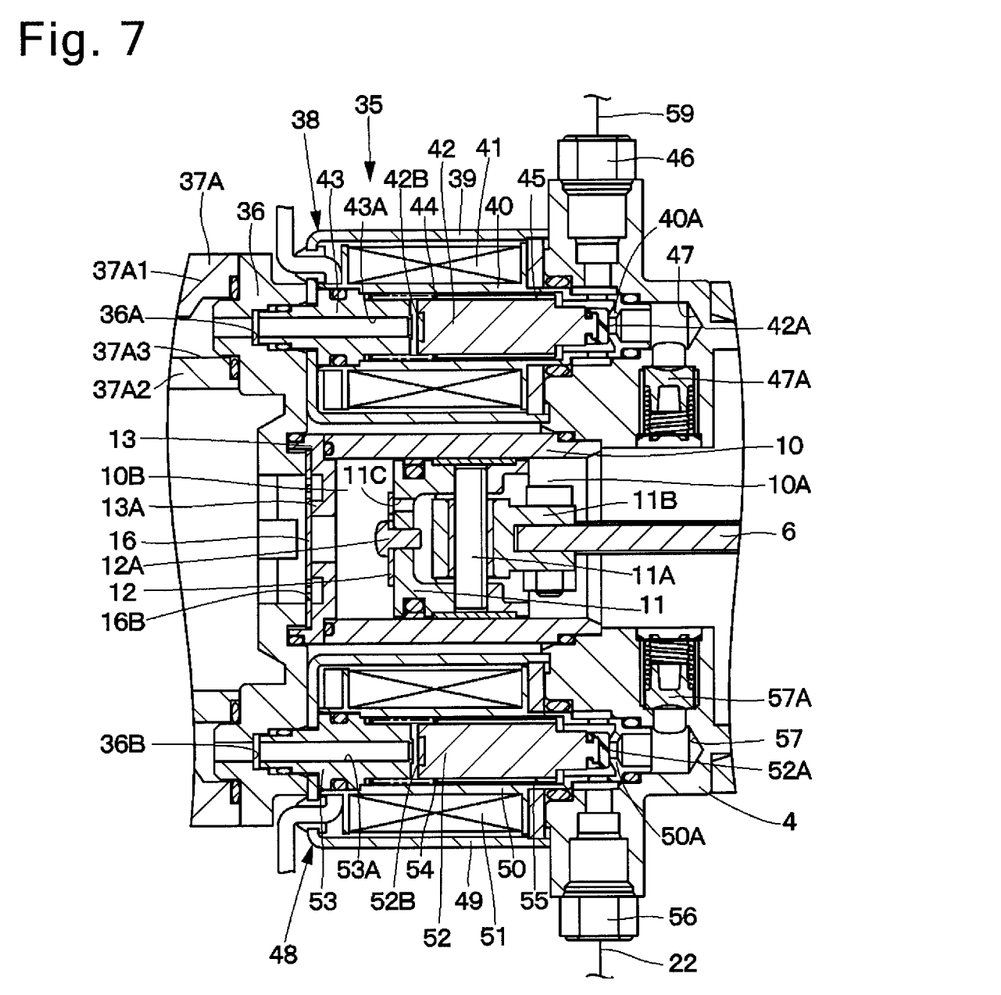
FIG. 7 is an enlarged view of a part VII of FIG. 6.
Figure 8:
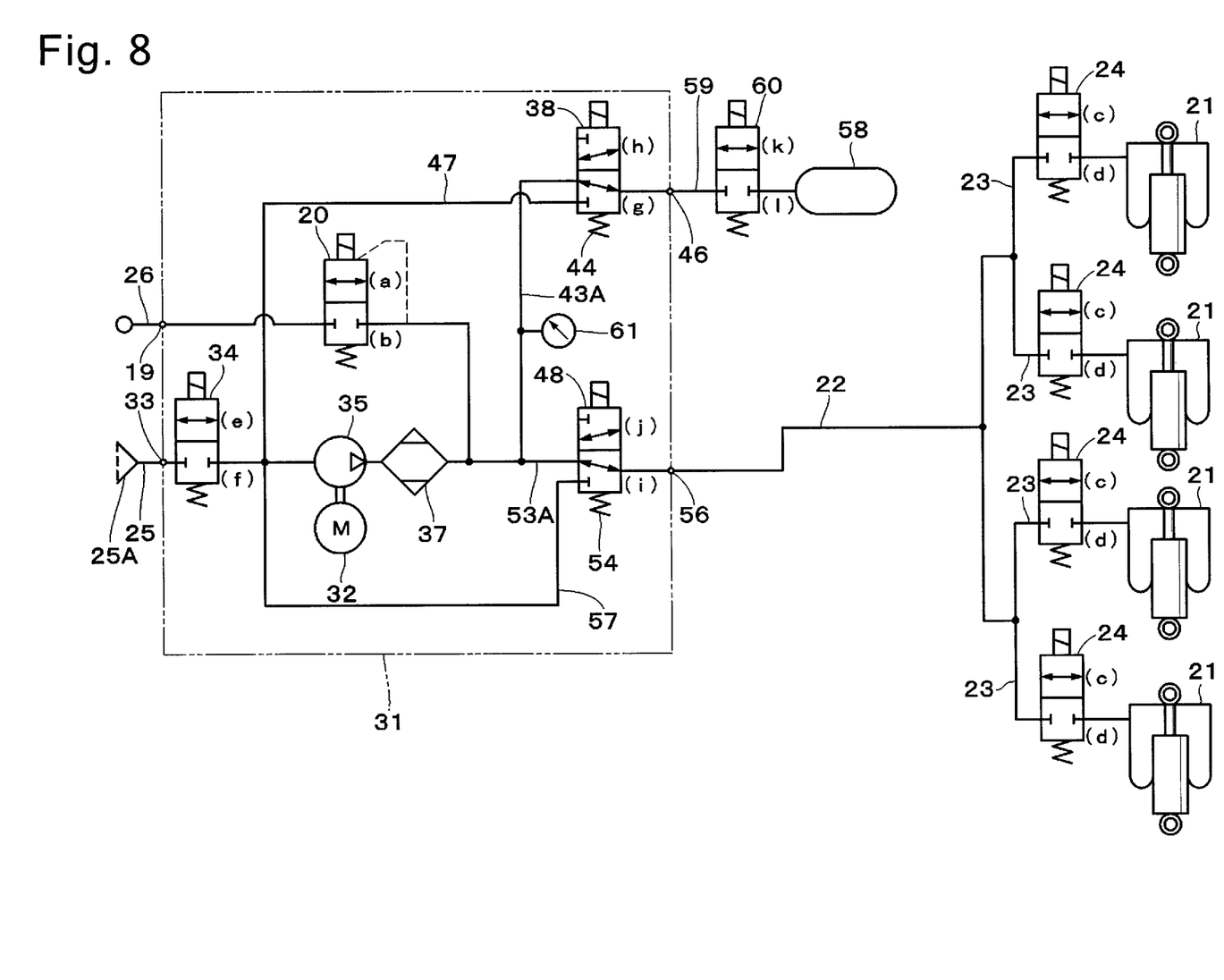
FIG. 8 is a pneumatic circuit diagram showing an air suspension mechanism using the compressor according to the second embodiment.

Next, FIGS. 6 to 8 show a second embodiment of the present invention. The feature of the second embodiment resides in that the compressor is used in a closed type air suspension mechanism. It should be noted that in the second embodiment the same constituent elements as those of the foregoing first embodiment are denoted by the same reference signs as used in the first embodiment, and a description thereof is omitted.

In FIG. 6, a compressor 31 is constructed by including a linear motor 32, a compression unit 35, an air dryer 37, a storage switching valve 38, and a supply-discharge switching valve 48.

The linear motor 32 is provided as a drive source of the compressor 31 at the other end side of the compressor 31. The linear motor 32 comprises a motor casing 3, a linear motor base 4, an armature 5, a mover 6, a spring 7, and so forth substantially in the same way as the linear motor 2 in the first embodiment. Further, a suction port 33 and an intake valve 34 are provided at the other end side of the linear motor 32 to suck air into the motor casing 3 from the outside during the suction stroke of the compressor 31.

Here, the linear motor base 4 is additionally provided with a first bypass passage 47, a second bypass passage 57, and so forth, which will be described later. These bypass passages 47 and 57, etc. need not necessarily be provided integrally with the linear motor base 4 but may be formed by discrete members.

The suction port 33 is provided in the bottom of the motor casing 3 at the other end side of the linear motor 2. The suction port 33 is communicated at one end thereof with the interior of the motor casing 3 through the intake valve 34, and has a suction line 25 connected to the other end thereof.

The intake valve 34 is provided between the suction port 33 and the motor casing 3 as a suction valve for sucking the outside air. The intake valve 34 is disposed such that the axial direction of the intake valve 34 extends in the axial direction of the piston 11. The intake valve 34 is a valve configured to allow the suction port 33 to communicate with the outside air and to cut off the communication therebetween. The intake valve 34 comprises an ON/OFF electromagnetic valve substantially in the same way as the exhaust valve 20, and is selectively switched between an open position (e) where the intake valve 34 opens the suction port 33 to allow suction of gas by the compressor 31 and a closed position (f) where the intake valve 34 closes the suction port 33 to block the suction of gas by the compressor 31. That is, the intake valve 34 is normally closed to cut off the interior of the motor casing 3 of the compressor 31 from the outside air. When the intake valve 34 opens, the interior of the motor casing 3 is communicated with the outside air to allow air sucked through the intake filter 25A to flow into the compressor 31.

The compression unit 35 is provided between the linear motor 32 and the air dryer 37. The compression unit 35 is constructed by including a cylinder 10, a piston 11, an intake valve 12, a valve plate 13, a discharge valve 16, and a cylinder head 36 substantially in the same way as the compression unit 9 in the first embodiment.

The cylinder head 36 is attached to one end of the cylinder 10 so as to close the one end of the cylinder 10. The cylinder head 36 engages the other end of the air dryer 37 as a discharge part from which compressed air is discharged, thereby closing the other end opening of the air dryer 37. The cylinder head 36 has circumferentially spaced mutually parallel mounting holes 36A and 36B formed therein to extend axially therethrough from one end side to the other end side of the cylinder head 36. Of the mounting holes 36A and 36B, the mounting hole 36A is fitted with a core 43 of a storage switching valve 38 (described later), and the mounting hole 36B is fitted with a core 53 of a supply-discharge switching valve 48 (described later).

The air dryer 37 is provided at one end side of the compressor 31 opposite the linear motor 32 across the compression unit 35. In this case, the air dryer 37 is disposed in series such that the axial direction of the air dryer 37 extends in the axial direction of the piston 11. That is, the axis of the air dryer 37 and the axis of the piston 11 extend substantially in a straight line. Further, the air dryer 37 is constructed by including a housing 37A, filters 17B1 and 17B2, a desiccant 17C, a spring 17D, and an exhaust pipe 17E substantially in the same way as the air dryer 17 in the first embodiment. However, unlike the air dryer 17 in the first embodiment, the air dryer 37 has a housing 37A having a dual-tube structure comprising an outer tube 37A1 and an inner tube 37A2.

The housing 37A is formed as a hollow container made of a metal material, e.g. an aluminum material in the shape of a bottomed cylinder closed at one end thereof and open at the other end thereof. The housing 37A is engaged at the other end thereof with the cylinder head 36 to thereby close the opening end of the housing 37A. In this case, the housing 37A comprises an outer tube 37A1 constituting an outer shell of the housing 37A, and an inner tube 37A2 provided coaxially with the outer tube 37A1. Between the outer tube 37A1 and the inner tube 37A2 is an annular passage 37A3 through which dry compressed air flows.

Here, the outer tube 37A1 has an exhaust port 19 and an exhaust valve 20 provided in the bottom thereof in the same way as in the first embodiment. However, the supply-discharge port 18, which has been stated in the first embodiment, is not provided in the bottom of the outer tube 37A1, but instead the annular passage 37A3 constitutes a supply-discharge port. Meanwhile, the inner tube 37A2 has an interior defined by filters 17B1 and 17B2. The space defined by the filters 17B1 and 17B2 is filled with a desiccant 17C.

The storage switching valve 38 is provided between the cylinder head 36 and the linear motor base 4 as a first electromagnetic valve at the outer peripheral side of the compression unit 35 (radially outside the cylinder 10). The storage switching valve 38 is disposed such that the axis of the storage switching valve 38 extends parallel to the axis of the piston 11. In other words, the storage switching valve 38 is disposed to extend parallel to the movement direction of the piston 11, or such that the movement direction of the piston 11 and the operating direction of the storage switching valve 38 are in the same direction. The storage switching valve 38 selectively allows a tank supply-discharge port 46 to communicate with either a core 43-side vent passage 43A or a first bypass passage 47 (described later) and cuts off the communication therebetween by driving a valving element 42 (described later).

Here, the storage switching valve 38 is, as shown in FIG. 7, constructed by including a valve cylinder casing 39 formed as a lidded cylindrical member and provided between the linear motor base 4 and the cylinder head 36, a valve retaining cylinder 40 disposed inside the valve cylinder casing 39 and having a distal end-side valve seat portion 40A air-tightly fitted in a part closer to the first bypass passage 47, a coil 41 located between the valve retaining cylinder 40 and the valve cylinder casing 39, being wound around the outer periphery of the valve retaining cylinder 40, a valving element 42 (described later), and a core 43.

The valving element 42 of the storage switching valve 38 is disposed in the valve retaining cylinder 40 to face opposite the core 43. The valving element 42 is, as shown in FIG. 7, slidably fitted in the valve retaining cylinder 40 between the valve seat portion 40A of the valve retaining cylinder 40 and the core 43. The valving element 42 has a first valve portion 42A provided at the distal end thereof. The first valve portion 42A seats on and unseats from the valve seat portion 40A. A valve spring 44 is disposed between the valving element 42 and the core 43. The valve spring 44 constantly urges the valving element 42 toward the valve seat portion 40A of the valve retaining cylinder 40.

The core 43 has a vent passage 43A of small diameter axially bored in the center thereof, and the proximal end of the valving element 42, which axially opposes the core 43, is provided with a second valve portion 42B which opens and closes the vent passage 43A. The vent passage 43A forms a passage connecting the air dryer 37 and a tank 58 (described later). Meanwhile, the valving element 42 has an inner passage section 45 formed on the outer periphery thereof to lie between the valving element 42 and the valve retaining cylinder 40. The inner passage section 45 comprises a plurality of grooves extending in the axial direction of the valving element 42. The inner passage section 45 is constantly communicated with the tank supply-discharge port 46 (replenishing line 59) at a position at the outer peripheral side of the first valve portion 42A.

Here, the one end (upstream end) of the inner passage section 45 is brought in and out of communication with the core 43-side vent passage 43A when the second valve portion 42B opens and closes, respectively. The other end (downstream end) of the inner passage section 45 is brought in and out of communication with the first bypass passage 47 when the first valve portion 42A opens and closes, respectively, by unseating from and seating on the valve seat portion 40A of the valve retaining cylinder 40. Consequently, the inner passage section 45, the tank supply-discharge port 46, and the replenishing line 59 are selectively brought in and out of communication with either the core 43-side vent passage 43A or the first bypass passage 47.

On the other hand, the vent passage 43A in the core 43 is constantly communicated with the annular passage 37A3, which is formed between the outer and inner tubes 37A1 and 37A2 of the air dryer 37. Thus, the vent passage 43A in the core 43 passes (is supplied with) compressed air dried in the air dryer 37.

The storage switching valve 38 comprises, for example, a 3-port, 2-position electromagnetic direction switching valve for selectively connecting the suction side (i.e. first bypass passage 47) of the compressor 31 or the discharge side (vent passage 43A) of the compressor 31 to a tank 58 (described later). That is, the storage switching valve 38 is selectively switched between a supply-discharge position (g) where the storage switching valve 38 supplies and discharges compressed air to and from the tank 58 through the tank supply-discharge port 46 and a replenishing line 59 (described later) and a switching position (h) where the storage switching valve 38 supplies compressed air from the tank 58 to the suction side of the compressor 31 through the first bypass passage 47.

The tank supply-discharge port 46 is provided at the outer peripheral side of the compression unit 35 at the other end side of the storage switching valve 38. The tank supply-discharge port 46 is connected at one end thereof to the storage switching valve 38 and at the other end thereof to the replenishing line 59. The tank supply-discharge port 46 is configured to supply compressed air compressed in the compression chamber 10B and dried in the air dryer 37 toward the tank 58 and to discharge compressed air discharged from the tank 58 toward a supply-discharge switching valve 48 (described later) through the storage switching valve 38 and the annular passage 37A3.

The first bypass passage 47 is provided in the linear motor base 4 at the other end side of the storage switching valve 38. The first bypass passage 47 is connected at one end thereof to the storage switching valve 38 and at the other end thereof to the interior of the non-compression chamber 10A (linear motor base 4). The first bypass passage 47 allows compressed air in the tank 58 to flow into the non-compression chamber 10A when the storage switching valve 38 is switched to the switching position (h). The first bypass passage 47 is provided with a check valve 47A preventing backflow of compressed air. The check valve 47A constitutes an intake valve which is in parallel relation to the intake valve 34.

The supply-discharge switching valve 48 is provided between the cylinder head 36 and the linear motor base 4 as a second electromagnetic valve at the outer peripheral side of the compression unit 35 (radially outside the cylinder 10). The supply-discharge switching valve 48 is provided at a position different from that of the storage switching valve 38 so as to extend parallel to the storage switching valve 38 at the outer peripheral side of the compression unit 35. The supply-discharge switching valve 48 is disposed such that the axis of the supply-discharge switching valve 48 extends parallel to the axis of the piston 11. In other words, the supply-discharge switching valve 48 is disposed to extend parallel to the movement direction of the piston 11, or such that the movement direction of the piston 11 and the operating direction of the supply-discharge switching valve 48 are in the same direction. The supply-discharge switching valve 48 selectively allows an air suspension supply-discharge port 56 to communicate with either a core 53-side vent passage 53A or a second bypass passage 57 and cuts off the communication therebetween by driving a valving element 52 (described later).

Here, the supply-discharge switching valve 48 is constructed substantially in the same way as the storage switching valve 38. That is, the supply-discharge switching valve 48 includes a valve cylinder casing 49 formed as a lidded cylindrical member and provided between the linear motor base 4 and the cylinder head 36, a valve retaining cylinder 50 disposed inside the valve cylinder casing 49 and having a distal end-side valve seat portion 50A air-tightly fitted in a part closer to a second bypass passage 57 (described later), a coil 51 located between the valve retaining cylinder 50 and the valve cylinder casing 49, being wound around the outer periphery of the valve retaining cylinder 50, a valving element 52 (described later), and a core 53.

The valving element 52 of the supply-discharge switching valve 48 is disposed in the valve retaining cylinder 50 to face opposite the core 53. The valving element 52 is, as shown in FIG. 7, slidably fitted in the valve retaining cylinder 50 between the valve seat portion 50A of the valve retaining cylinder 50 and the core 53. The valving element 52 has a first valve portion 52A provided at the distal end thereof. The first valve portion 52A seats on and unseats from the valve seat portion 50A. A valve spring 54 is disposed between the valving element 52 and the core 53. The valve spring 54 constantly urges the valving element 52 toward the valve seat portion 50A of the valve retaining cylinder 50.

The core 53 has a vent passage 53A of small diameter axially bored in the center thereof, and the proximal end of the valving element 52, which axially opposes the core 53, is provided with a second valve portion 52B which opens and closes the vent passage 53A. The vent passage 53A forms an air spring passage connecting the air dryer 37 and the air suspensions 21. Meanwhile, the valving element 52 has an inner passage section 55 formed on the outer periphery thereof to lie between the valving element 52 and the valve retaining cylinder 50. The inner passage section 55 comprises a plurality of grooves extending in the axial direction of the valving element 52. The inner passage section 55 is constantly communicated with the air suspension supply-discharge port 56 (supply-discharge line 22) at a position at the outer peripheral side of the first valve portion 52A.

Here, the one end (upstream end) of the inner passage section 55 is brought in and out of communication with the core 53-side vent passage 53A when the second valve portion 52B opens and closes, respectively. The other end (downstream end) of the inner passage section 55 is brought in and out of communication with a second bypass passage 57 (described later) when the first valve portion 52A opens and closes, respectively, by unseating from and seating on the valve seat portion 50A of the valve retaining cylinder 50. Thus, the inner passage section 55, the air suspension supply-discharge port 56, and the supply-discharge line 22 are selectively brought in and out of communication with either the core 53-side vent passage 53A or the second bypass passage 57.

On the other hand, the vent passage 53A in the core 53 is constantly communicated with the annular passage 37A3, which is formed between the outer and inner tubes 37A1 and 37A2 of the air dryer 37. Thus, the vent passage 53A in the core 53 passes (is supplied with) compressed air dried in the air dryer 37.

The supply-discharge switching valve 48 comprises, for example, a 3-port, 2-position electromagnetic direction switching valve for selectively connecting the suction side (i.e. second bypass passage 57) of the compressor 31 or the discharge side (vent passage 53A) of the compressor 31 to the air suspensions 21. That is, the supply-discharge switching valve 48 is selectively switched between a supply-discharge position (i) where the supply-discharge switching valve 48 supplies and discharges compressed air to and from the air suspensions 21 through the air suspension supply-discharge port 56, the supply-discharge line 22, and the branch lines 23 and a switching position (j) where the supply-discharge switching valve 48 supplies compressed air from the air suspensions 21 to the suction side of the compressor 31 through a second bypass passage 57 (described later).

The air suspension supply-discharge port 56 is provided at the outer peripheral side of the compression unit 35 at the other end side of the supply-discharge switching valve 48. The air suspension supply-discharge port 56 is connected at one end thereof to the supply-discharge switching valve 48 and at the other end thereof to the supply-discharge line 22. The air suspension supply-discharge port 56 is configured to supply compressed air compressed in the compression chamber 10B toward the air suspensions 21 and to discharge compressed air discharged from the air suspensions 21 to the outside through the exhaust pipe 17E.

The second bypass passage 57 is provided in the linear motor base 4 at the other end side of the supply-discharge switching valve 48. The second bypass passage 57 is connected at one end thereof to the supply-discharge switching valve 48 and at the other end thereof to the interior of the non-compression chamber 10A (linear motor base 4). The second bypass passage 57 allows compressed air in the air suspensions 21 to flow into the non-compression chamber 10A when the supply-discharge switching valve 48 is switched to the switching position (j). The second bypass passage 57 is provided with a check valve 57A preventing backflow of compressed air. The check valve 57A constitutes an intake valve which is in parallel relation to the intake valve 34.

Next, the compressor 31 of the second embodiment will be explained in detail by using FIG. 8 and by taking, as an example, a case where the compressor 31 is applied to an air suspension mechanism of a vehicle, e.g. a four-wheel automobile. The air suspension mechanism is constructed by including a compressor 31, air suspensions 21, a supply-discharge line 22, supply-exhaust valves 24, a tank 58, a replenishing line 59, and so forth.

The tank 58 stores compressed air discharged from the air dryer 37 of the compressor 31, which has been pressurized higher than the atmospheric pressure. The tank 58 and the compressor 31 are connected through a replenishing line 59 (described later). Compressed air discharged from the compressor 31 is stored in the tank 58 through the replenishing line 59. The compressed air stored in the tank 58 (or compressed air discharged from the compressor 31) is supplied to the air suspensions 21 through the supply-discharge line 22 and the branch lines 23.

The replenishing line 59 is a line connecting between the tank supply-discharge port 46 and the tank 58 to replenish the tank 58 with compressed air. The replenishing line 59 is provided with a tank valve 60 switching between supply and discharge of compressed air to and from the tank 58.

The tank valve 60 is provided in the replenishing line 59 and comprises, for example, an ON/OFF electromagnetic valve. The tank valve 60 is selectively switched between an open position (k) where the tank valve 60 opens the replenishing line 59 to allow supply and discharge of compressed air to and from the tank 58 and a closed position (l) where the tank valve 60 closes the replenishing line 59 to block the supply and discharge of compressed air to and from the tank 58.

As shown in FIG. 8, a pressure sensor 61 is provided, for example, halfway in the vent passage 43A between the storage switching valve 38 and the air dryer 37. The pressure sensor 61 detects the pressure of compressed air in the tank 58 by detecting the pressure in the vent passage 43A.

The following is an explanation of the operation of the compressor 31 according to the second embodiment having the above-described structure.

Here, when compressed air is not sufficiently stored in the tank 58 (i.e. when the pressure in the tank 58 is lower than a standard set pressure), the tank valve 60 and the intake valve 34 are switched from the closed positions (l) and (f) to the open positions (k) and (e), respectively, and the storage switching valve 38 is switched to the supply-discharge position (g), with the exhaust valve 20 and the supply-exhaust valves 24 held in the closed positions (b) and (d), respectively. In this state, the compressor 31 is activated (i.e. to perform a compression operation).

Consequently, the compression unit 35 of the compressor 31 sucks the outside air through the intake filter 25A and the suction line 25, pressurizes (compresses) the sucked air, and discharges compressed air toward the air dryer 37. The compressed air is dried by the air dryer 37 before being stored in the tank 58 through the passage 37A3 in the housing 37A, the vent passage 43A, the tank supply-discharge port 46, the replenishing line 59, and the tank valve 60. When the pressure in the tank 58 has reached a predetermined set pressure, for example, the linear motor 32 (i.e. compressor 31) is stopped, and the tank valve 60 and the intake valve 34 are switched to the closed positions (l) and (f), respectively. In this way, a sufficient amount of compressed air can be filled and stored in the tank 58.

Next, when the vehicle height is to be raised, the compressed air in the tank 58 can be supplied to the air suspensions 21 even with the compressor 31 stopped, for example. That is, in this case, the tank valve 60 is switched from the closed position (l) to the open position (k), and the supply-exhaust valves 24 are switched to the open position (c), with the storage switching valve 38 and the supply-discharge switching valve 48 held in the supply-discharge positions (g) and (i), respectively. Consequently, compressed air in the tank 58 is led out into the supply-discharge line 22 and supplied into the air suspensions 21 through the branch lines 23. Thus, the air suspensions 21 can be extended rapidly by supplying compressed air stored in the tank 58 into the air suspensions 21. Therefore, the vehicle height can be raised rapidly as compared, for example, to a structure in which compressed air produced by the compressor 31 is supplied directly into the air suspensions 21.

At this time, in a case where the vehicle is carrying a load and a high pressure is being applied to the air suspensions 21 (particularly, in a case where the pressure in the air suspensions 21 is higher than the pressure in the tank 58), it is necessary to supply the air suspensions 21 with compressed air at a pressure higher than that of the compressed air in the tank 58 in order to raise the vehicle height. Therefore, the storage switching valve 38 is switched to the switching position (h) to allow the compressed air in the tank 58 to flow into the non-compression chamber 10A (motor casing 3) of the compressor 31 through the first bypass passage 47 and the check valve 47A (intake valve). Consequently, the compressed air in the tank 58 can be further compressed in the compressor 31 by reciprocating motion of the piston 11 in the cylinder 10, so that high-pressure compressed air can be supplied to the air suspensions 21 through the air dryer 37, the supply-discharge switching valve 48, and so forth.

After completion of the vehicle height raising operation, the supply-exhaust valves 24 are switched to the closed position (d) to close the branch lines 23. Thus, the supply of compressed air to the air suspensions 21 is cut off to keep the air suspensions 21 in the extended position, thereby allowing the vehicle height to be maintained in the raised position.

On the other hand, when the vehicle height is to be lowered, the tank valve 60 and the supply-exhaust valves 24 are switched to the open positions (k) and (c), respectively, and the supply-discharge switching valve 48 is switched from the supply-discharge position (i) to the switching position (j), with the storage switching valve 38 held in the supply-discharge position (g). In this state, the compressor 31 is started to operate by the linear motor 32. Thereupon, compressed air in the air suspensions 21 is discharged (led out) into the second bypass passage 57 through the branch lines 23 and the supply-discharge line 22. The compressed air led out into the second bypass passage 57 flows into the motor casing 3.

At this time, compressed air (gas discharged from the air suspensions 21) may be recompressed by the compressor 31 and delivered toward the tank 58. Alternatively, the compressed air may be simply allowed to flow out of the motor casing 3 toward the tank 58 without being substantially compressed. That is, the operating condition of the compressor 31 is determined by the pressure difference between the pressure in the tank 58 and the pressure in the air suspensions 21. Compressed air delivered (or allowed to flow out) from the compression chamber 10B of the compression unit 35 is replenished into the tank 58 through the air dryer 37, the vent passage 43A, and the replenishing line 59. As a result, compressed air is discharged from the air suspensions 21, and the air suspensions 21 are switched to a contracted state, thereby enabling the vehicle height to be lowered.

Here, when the pressure in the tank 58 has increased to the upper limit value of the predetermined set pressure, the tank valve 60 is returned to the closed position (l) on the basis of a detection signal from the pressure sensor 61, for example. Thereafter, the supply-discharge switching valve 48 is switched from the switching position (j) to the supply-discharge position (i), and the exhaust valve 20 is switched from the closed position (b) to the open position (a). Thus, compressed air from the air suspensions 21 can be discharged directly to the outside from the exhaust line 26 through the branch lines 23, the supply-discharge line 22, the vent passage 53A, the exhaust pipe 17E, and the exhaust port 19.

It should be noted that when the vehicle height is to be lowered, if the pressure in the tank 58 is lower than the pressure in the air suspensions 21, compressed air from the air suspensions 21 can be passed so as to be discharged into the tank 58 through the vent passage 53A, the passage 37A3 in the air dryer 37, the vent passage 43A, and the replenishing line 59 without passing via the second bypass passage 57 and the compression unit 35, with the supply-discharge switching valve 48 held switched to the supply-discharge position (i).

Thus, the second embodiment can provide substantially the same advantages as those of the first embodiment. In the second embodiment, the storage switching valve 38 is disposed at the outer peripheral side of the compression unit 35 such that the axis of the storage switching valve 38 extends parallel to the axis of the piston 11. Accordingly, the storage switching valve 38 can be arranged close to the compression unit 35 to achieve a compact structure. As a result, the compressor 31 can be reduced in size in the radial direction thereof. Therefore, it is possible to increase the degree of freedom of layout design and to achieve space saving. Accordingly, the vehicle mountability of the compressor 31 can be improved.

In addition, the supply-discharge switching valve 48 is disposed at the outer peripheral side of the compression unit 35 such that the axis of the supply-discharge switching valve 48 extends parallel to the axis of the piston 11. Accordingly, the supply-discharge switching valve 48 can be arranged close to the compression unit 35 to achieve a compact structure. As a result, the compressor 31 can be reduced in size in the radial direction thereof. Therefore, it is possible to increase the degree of freedom of layout design and to achieve space saving. Accordingly, the vehicle mountability of the compressor 31 can be improved.

In addition, the intake valve 34 is disposed such that the axial direction of the intake valve 34 extends in the axial direction of the piston 11. Consequently, the linear motor 32, the compression unit 35, the air dryer 37, and the intake valve 34 can be provided in series in the axial direction of the compressor 1. Accordingly, the compressor 31 can be reduced in radial dimension thereof, and the compressor 31 can be reduced in thickness and formed in a rectilinear shape. In consequence of the reduction in size of the compressor 31, it is possible to increase the degree of freedom of layout design and to achieve space saving. Therefore, the vehicle mountability of the compressor 31 can be improved.

It should be noted that, in the foregoing first embodiment, the compressor 1 is used in an open type air suspension mechanism that sucks and discharges the outside air without using a tank. However, the present invention is not limited thereto. For example, the compressor may be configured for use in a closed type air suspension mechanism. It should be noted that the present invention is applicable to an open type air suspension mechanism that uses a tank.

Further, in the foregoing first embodiment, the motor casing 3 of the linear motor 2 and the housing 17A of the air dryer 17 are each formed in a circular cylindrical shape. However, the present invention is not limited thereto. For example, the motor casing and the housing may be each formed in a shape other than a circular cylindrical shape. The same shall apply to the second embodiment.

Further, in the first embodiment, the linear motor 2, the compression unit 9, and the air dryer 17 are disposed such that the center axes of these components coincide with each other. However, the present invention is not limited thereto. The present invention does not exclude an arrangement in which the center axis of the compression unit and the center axis of the air dryer are slightly offset from the center axis of the linear motor, for example. Alternatively, the center axis of the linear motor and the center axis of the air dryer may be offset from the center axis of the compression unit, or the center axis of the linear motor and the center axis of the compression unit may be offset from the center axis of the air dryer. The same shall apply to the second embodiment.

Further, in the second embodiment, the pressure sensor 61 is provided in the vent passage 43A. However, the present invention is not limited thereto. For example, the pressure sensor may be provided in the tank or in a place other than the tank.

Further, in the first and second embodiments, the compressor 1 (31) is installed in a vehicle such as a four-wheel automobile. However, the present invention is not limited thereto. For example, the compressor may be applied to a compressor or the like driving a pneumatic device such as an air cylinder.

The following is an explanation of inventions included in the foregoing embodiments. That is, the present invention has a passage connecting the air dryer and a tank storing a working gas discharged from the air dryer, and a first electromagnetic valve provided in the passage, the first electromagnetic valve being disposed at the outer peripheral side of the compression unit such that the axis of the first electromagnetic valve extends along the axis of the piston. With this structure, the compressor can be reduced in size in the radial direction thereof, and it is possible to improve the vehicle mountability of the compressor.

In addition, the present invention has an air spring passage branched off from the passage to connect the air dryer and an air spring supporting a vehicle body vertically movably, and a second electromagnetic valve provided in the air spring passage, the second electromagnetic valve being disposed at the outer peripheral side of the compression unit such that the axis of the second electromagnetic valve extends along the axis of the piston. With this structure, the compressor can be reduced in size in the radial direction thereof, and it is possible to improve the vehicle mountability of the compressor.

In addition, the present invention has a suction valve for sucking the outside air, the suction valve being disposed at the other end side of the linear motor such that the axis of the suction valve extends along the axis of the piston. With this structure, the compressor can be reduced in size in the radial direction thereof, and it is possible to improve the vehicle mountability of the compressor.

Examples of compressors according to the foregoing embodiments include those according to the following aspects.

According to a first aspect, a compressor comprises a linear motor having a reciprocating mover, a compression unit having a piston connected to the mover at one end side of the linear motor so as to reciprocate and a cylinder slidably accommodating the piston to form a compression chamber, and an air dryer connected to a discharge part of the compression chamber of the compression unit and filled therein with a desiccant, the air dryer being disposed along the axis in the movement direction of the mover and the piston.

According to a second aspect, the compressor in the first aspect has a passage connecting the air dryer and a tank storing a working gas discharged from the air dryer, and a first electromagnetic valve provided in the passage, the first electromagnetic valve being disposed at the outer peripheral side of the compression unit such that the movement direction of the piston and the operating direction of the first electromagnetic valve are in the same direction.

According to a third aspect, the compressor in the second aspect has an air spring passage branched off from the passage to connect the air dryer and an air spring supporting a vehicle body vertically movably, and a second electromagnetic valve provided in the air spring passage, the second electromagnetic valve being disposed at the outer peripheral side of the compression unit such that the movement direction of the piston and the operating direction of the second electromagnetic valve are in the same direction.

According to a fourth aspect, the compressor in any of the first to third aspects has a suction valve for sucking the outside air, the suction valve being disposed at the other end side of the linear motor such that the movement direction of the piston and the operating direction of the suction valve are in the same direction.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the technical scope of the present invention. The foregoing embodiments may be combined at will.

The present application claims priority to Japanese Patent Application No. 2015-251840 filed on Dec. 24, 2015. The entire disclosure of Japanese Patent Application No. 2015-251840 filed on Dec. 24, 2015 including specification, claims, drawings and summary is incorporated herein by reference in its entirety.

The entire disclosure of Japanese Patent Application Laid-Open Publication No. Hei 11-264375 including specification, claims, drawings and summary is incorporated herein by reference in its entirety.

REFERENCE SIGNS LIST 1, 31: compressor
2, 32: linear motor
6: mover
9, 35: compression unit
10: cylinder
10B: compression chamber
11: piston
12: intake valve
14, 36: cylinder head (discharge part)
17, 37: air dryer
17C: desiccant
21: air suspension (air spring)
34: intake valve (suction valve)
38: storage switching valve (first electromagnetic valve)
43A: vent passage (tank passage)
48: supply-discharge switching valve (second electromagnetic valve)
53A: vent passage (air spring passage)
58: tank

The invention claimed is:

1. A compressor comprising:
a linear motor having a reciprocating mover;
a motor casing that covers the linear motor;
a compression unit having a piston connected to the mover at one end side of the linear motor so as to reciprocate, and a cylinder disposed at one end side of the motor casing, having a smaller diameter than the motor casing, and slidably accommodating the piston to form a compression chamber;
an air dryer connected to a discharge part of the compression chamber of the compression unit and filled therein with a desiccant;
a passage that connects the air dryer and a tank that stores a working gas discharged from the air dryer; and
a first electromagnetic valve provided in the passage, disposed radially outside the compression unit, the first electromagnetic valve being further disposed between the motor casing and the air dryer, and including a first electromagnetic valve cylinder casing and a first electromagnetic valving element arranged inside the first electromagnetic valve cylinder casing,
wherein the first electromagnetic valve is configured to be selectively switched between a first position in which compressed working gas is supplied to the tank and is discharged from the tank, and a second position in which compressed working gas is supplied from the tank to a suction side of the compression unit,
the air dryer being disposed along an axis in a movement direction of the mover and the piston, and
the first electromagnetic valve being disposed such that the movement direction of the piston and a movement direction of the first electromagnetic valving element are in a same direction.

2. The compressor of claim 1, further comprising:
an air spring passage branched off from the passage to connect the air dryer and an air spring that supports a vehicle body vertically movably; and
a second electromagnetic valve provided in the air spring passage and disposed radially outside the compression unit;
the second electromagnetic valve including a second electromagnetic valve cylinder casing and a second electromagnetic valving element arranged inside the second electromagnetic valve cylinder casing, the second electromagnetic valve being disposed such that the movement direction of the piston and a movement direction of the second electromagnetic valving element are in a same direction.

3. The compressor of claim 2, further comprising:
a suction valve that sucks outside air, the suction valve being disposed at another end side of the linear motor such that the movement direction of the piston and an operating direction of the suction valve are in a same direction.

4. The compressor of claim 1, further comprising:
a suction valve that sucks outside air, the suction valve being disposed at another end side of the linear motor such that the movement direction of the piston and an operating direction of the suction valve are in a same direction.

* * * * *